Patented July 19, 1938

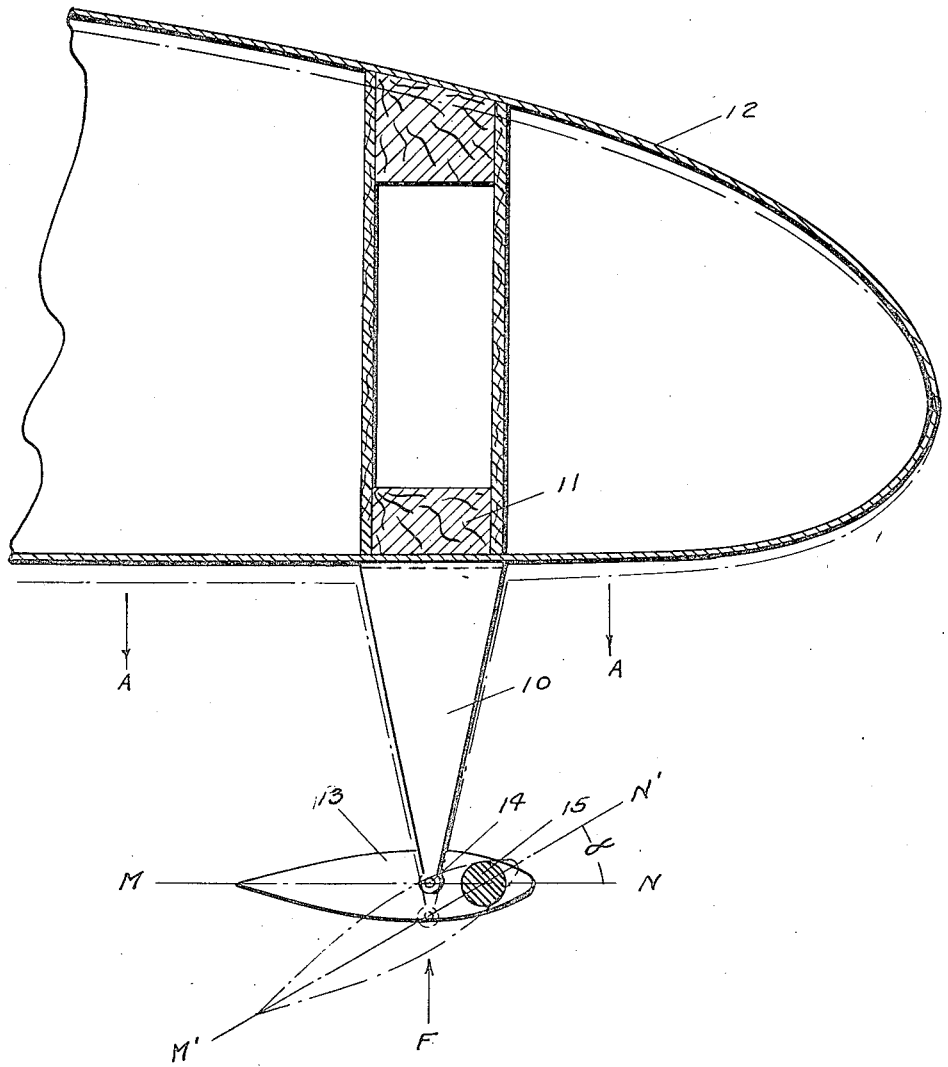

2,124,098

UNITED STATES PATENT OFFICE 2,124,098

DAMPENING DEVICE

John Elliott Younger, Berkeley, Calif.

Application September 16, 1933, Serial No. 689,704

1 Claim. (Cl. 244—75)

The present invention relates generally to aircraft and more particularly to airfoil flutter dampening devices.

The primary object of the present invention is to provide inertia actuated means to prevent the fluttering of airfoil surfaces of an aircraft which consists in attaching to airfoil surfaces, such as the wings, ailerons, rudders, or propellers, a dampening device which will set up forces when a fluttering of the airfoil occurs to counter-act such flutter or dampen the motion of the airfoil surface.

A further object of the present invention is to provide an inertia actuated flutter dampening device including a pivotally mounted auxiliary airfoil, the center of gravity of which is so disposed with respect to its axis of pivot such that an increase in its angle of attack is automatically obtained upon the acceleration of the airfoil surface to which it is pivotally secured to set up a force which opposes the motion of the airfoil surfaces.

The efficiency and dependability claimed for this device results from its extreme simplicity and from the utilization of forces already involved in airplane flight without the assistance of extraneous means such as motors or springs or other controlled or controllable devices for effecting its operation.

With these and other objects in view, my invention consists in the arrangement, construction and combination of the various parts of my improved device, as described in the specification, defined in the appended claim and illustrated in the accompanying drawing, in which is presented a vertical sectional view of an airfoil surface such for example as the wing of an aircraft to which is attached my improved dampening device.

Referring more particularly to the drawing, the dampening device in the preferred embodiment of my invention herein illustrated comprises generally a depending support 10 which in the preferred embodiment of my invention is fixedly attached to the lower end of the main spar 11 of an airfoil surface 12, such for example as the wing of an aircraft. While I have shown the dampening device as being connected to an airfoil surface in the manner illustrated in the drawing, it is to be understood that it may be located in a number of positions with reference to the wing of the aircraft such as in the front, above, behind, below or in any combination of these positions. As shown in the drawing, the damper or auxiliary airfoil surface 13 consists of a small airfoil free to turn through a fixed angle about a pivot 14 provided in the lower end of the support 10. This pivot is located a fixed distance behind the center of gravity of the airfoil. In order to make the damper more effective and allow a convenient location of the pivot, a weight of some heavy material may be placed in the nose of the airfoil as shown in the sections indicated by the numeral 15. An airfoil of any shape may be used, but in the present embodiment of the invention I have shown an airfoil of symmetrical shape inasmuch as its center of pressure is stable and since the pivot may be easily located at its center of pressure. It will be noted by observing the drawing that an acceleration of the wing downwardly as shown in phantom and indicated by the arrows "A" will cause the dampening airfoil 13 to pivot about its center of gravity, thus changing the direction of its chord from the line M—N to the line M'—N' and creating the angle of attack ($\alpha$). Due to the forward motion of the airplane, a force F is induced, which opposes the movement of the wing. An upward acceleration of the wing will cause the dampening airfoil to set at a negative angle and thus to oppose the upward motion. In this manner the damping airfoil always opposes the tendency of the wing or airfoil to flutter.

While I have shown my invention in but one form, it will be obvious to those skilled in the art, that it is not so limited, but is constructible with various changes and modifications without departing from the spirit thereof, and I desire therefore that only such limitations shall be placed thereon as are imposed by the prior art or as I specifically set forth in the appended claim.

What I claim is:

In an aircraft, a wing subject to uncontrolled relative movement in flight, said wing having a main spar, a support rigidly attached to said spar and extending below said wing, an auxiliary airfoil for damping said relative movement controlled in its own movement only by its response to air flow and inertia, pivoted to swing freely on and with respect to said support, said airfoil having its center of pressure rearward of said pivot and having its center of gravity forward of said pivot.

JOHN ELLIOTT YOUNGER.